United States Patent [19]

Lee et al.

[11] Patent Number: 4,613,659
[45] Date of Patent: Sep. 23, 1986

[54] LOW TEMPERATURE POLYMETHYLSILOXANE CONTAINING SILICON-BONDED HYDROGEN AND CURABLE COMPOSITIONS MADE THEREWITH

[75] Inventors: Chi-long Lee; Myron T. Maxson, both of Midland, Mich.

[73] Assignee: Dow Corning Corporation, Midland, Mich.

[21] Appl. No.: 809,455

[22] Filed: Dec. 16, 1985

[51] Int. Cl.⁴ .............................................. C08G 77/06
[52] U.S. Cl. ........................................ 528/15; 528/31; 528/32; 525/478
[58] Field of Search ............................. 528/15, 31, 32; 525/478

[56] References Cited

U.S. PATENT DOCUMENTS

| | | | |
|---|---|---|---|
| 2,823,218 | 1/1958 | Speier et al. | 260/448.2 |
| 3,159,601 | 12/1964 | Ashby | 260/46.5 |
| 3,159,662 | 12/1964 | Ashby | 260/448.2 |
| 3,188,299 | 6/1965 | Chalk | 260/46.5 |
| 3,188,300 | 6/1965 | Chalk | 260/46.5 |
| 3,192,181 | 6/1965 | Moore | 260/46.5 |
| 3,220,972 | 11/1965 | Lamoreaux | 260/46.5 |
| 3,344,111 | 9/1967 | Chalk | 260/46.5 |
| 3,383,356 | 5/1968 | Nielsen | 260/46.5 |
| 3,419,593 | 12/1968 | Willing | 260/448.2 |
| 3,445,420 | 5/1969 | Kookootsedes et al. | 260/37 |
| 3,453,233 | 7/1969 | Flatt | 260/46.5 |
| 3,453,234 | 7/1969 | Kookootsedes | 260/46.5 |
| 3,532,649 | 10/1970 | Smith et al. | 260/18 |

*Primary Examiner*—Melvyn I. Marquis
*Attorney, Agent, or Firm*—Roger H. Borrousch

[57] ABSTRACT

Polymethylsiloxanes containing silicon-bonded hydrogen exhibit low temperature properties and can be made into gels with which also exhibit low temperature properties or into elastomeric materials. The polymethylsiloxanes have 84 to 96 mole percent dimethylsiloxane units, 0.5 to 6 mole percent trimethylsiloxy units, 2 to 10 mole percent methylsilsesquioxane units, and 0.25 to 3 mole percent monohydrogendimethylsiloxy units and the total mole percent of the trimethylsiloxy units and the monohydrogendimethylsiloxy units is at least 1.5.

15 Claims, No Drawings

LOW TEMPERATURE POLYMETHYLSILOXANE CONTAINING SILICON-BONDED HYDROGEN AND CURABLE COMPOSITIONS MADE THEREWITH

BACKGROUND OF THE INVENTION

1. Field of the Invention

This invention relates to a polymethylsiloxane which contains silicon-bonded hydrogen atoms and exhibits low temperature properties (ca. $-120°$ C.), i.e. does not crystallize at low temperatures. This invention also relates to compositions made from this polymethylsiloxane which contains silicon-bonded hydrogen atoms, such as by adding a crosslinking agent. The compositions can also exhibit the low temperature properties.

2. Background Information

The need for materials which exhibits low temperature properties continues to exist because more applications for such materials are being found. Many applications are found in aerospace equipment and uses in the arctic regions. Fluids and cured materials which will not change properties when exposed to low temperatures, such as $-120°$ C., find utility in many places. Low temperature silicones gels, for example, are described by Brown et al. in U.S. Pat. No. 4,374,967, issued Feb. 22, 1983. These silicone gels find use as dielectric silicone gels. Brown et al. teach that their gels can be made by using a special vinyl containing polyorganosiloxane which contains dimethylsiloxane units, methylsilsesquioxane units, trimethylsiloxy units, and monovinyldimethylsiloxy units to obtain the low temperature properties. Brown et al. prefers to crosslink the gel with a polyorganosiloxane which has two silicon-bonded hydrogen atoms per molecule, and these hydrogen atoms are preferably on the ends of the linear polymer.

Polymethylsiloxanes containing silicon-bonded hydrogen atoms which also exhibit low temperature properties are not known to the inventors. Polmanteer et al. in U.S. Pat. No. 3,697,473, issued October 10, 1972, teach many types of polyorganosiloxanes which contain silicon-bonded hydrogen atoms but do not teach any class of such polyorganosiloxanes which exhibit low temperature properties. Polmanteer et al. at column 5, lines 28 to 30, teach a copolymer containing three to ten units of $R_2'HSiO_{0.5}$ and the remaining units being $R_2'SiO_2$, $R_2'SiO_{1.5}$, and $R_2'SiO_{0.5}$ in which R' is an alkyl radical having from 1 to 12 carbon atoms, phenyl, or 3,3,3-trifluoropropyl. Polmanteer et al. do not teach any low temperature properties but are interested in obtaining high strength properties.

SUMMARY OF THE INVENTION

An object of this invention is to provide a polymer which has low temperature properties and which has silicon-bonded hydrogen atoms. It is also an object of this invention to provide compositions made from the polymer with the low temperature properties to make cured products which can also have low temperature properties.

The present invention relates to a polymethylsiloxane containing silicon-bonded hydrogen consisting of 84 to 96 mole percent dimethylsiloxane units, 2 to 10 mole percent methylsilsesquioxane units, 0.5 to 6 mole percent trimethylsiloxy units, and 0.25 to 3 mole percent monohydrogendimethylsiloxy units, where the total mole percent of trimethylsiloxy units and monohydrogendimethylsiloxy units is at least 1.5.

This invention also relates to a composition comprising the polymethylsiloxane containing the silicon-bonded hydrogen and a crosslinking agent.

DESCRIPTION OF THE PREFERRED EMBODIMENTS

The polymethylsiloxanes which contain the silicon-bonded hydrogen preferably are those which contain 90 to 94 mole percent of dimethylsiloxane units which have the formula $(CH_3)_2SiO$, 4.5 to 7 mole percent methylsilsesquioxane units which have the formula $CH_3SiO_{1.5}$, 2 to 3 mole percent trimethylsiloxy units which have the formula $(CH_3)_3SiO_{0.5}$, and 0.5 to 2 mole percent monohydrogendimethylsiloxy units which have the formula $H(CH_3)_2SiO_{0.5}$, where the total mole percent of the trimethylsiloxy units and the monohydrogendimethylsiloxy units is from 2.5 to 5.

The polymethylsiloxanes which contain the silicon-bonded hydrogen atoms are made by using an acid catalyzed polymerization which is used because basic conditions will cause the siliconbonded hydrogen atoms to be destroyed. The well known acid catalyzed polymerization methods can be used.

The silicon-bonded hydrogen containing polymethylsiloxane can be crosslinked to provide a cured composition, such as a gel or an elastomeric material. The gels find use as potting materials for electrical equipment. Such gels need to have both satisfactory dielectric properties and low temperature properties if they are to be used in the aerospace field or in the equipment used in the arctic regions of the world.

The crosslinker can be any materials which will cause the hydrogen-containing polymethylsiloxane to crosslink to a gel or an elastomeric material. Preferably the crosslinker is a vinyl containing polyorganosiloxane and a hydrosilation catalyst, such as a platinum catalyst. Such compositions can also have a platinum catalyst inhibitor which will retard the curing reaction at room temperature or slow it down to extend the pot life.

The vinyl containing polyorganosiloxanes can be those which contain more than one silicon bonded vinyl radical per molecule. Preferably, these vinyl containing polyorganosiloxanes have an average of at least two vinyls per molecule. One type of vinyl containing polyorganosiloxane is the vinyldimethylsiloxy endblocked polydimethylsiloxane which preferably has from 3 to 20 dimethylsiloxane units per molecule. Another type of vinyl containing polyorganosiloxane is the vinyl containing polymer described in U.S. Pat. No. 4,374,967 which is hereby incorporated by reference to show the preparation of the vinyl containing polymethylsiloxane and the polymethylsiloxane per se. These vinyl containing polymethylsiloxanes described by Brown et al. consist essentially of 80 to 96.5 mole percent of dimethylsiloxane units, 2 to 10 mole percent of methylsilsesquioxane units, 1.25 to 6.0 mole percent trimethylsiloxy units, and 0.25 to 4.0 mole percent vinyldimethylsiloxy units.

The hydrosilation catalyst can be any of those catalysts known to catalyze the addition of silicon-bonded hydrogen atoms to silicon-bonded vinyl radicals. Such catalysts include platinum, the preferred type of hydrosilation catalyst, rhodium, and other platinum metal catalyst. These catalysts include the metals in finely divided form, compounds of these metals, salts of these metals, and complexes of these metals. The preferred catalyst are those which are compatible with the siloxane ingredients of the composition for the reason that compatible catalysts are better dispersed in the composition and therefor provide an even reaction throughout the composition mixture, also that the compatible catalyst provide clear cured products in those cases where this feature is an advantage, such as being able to see the electrical components which are covered by the cured silicone potting gel made using the composition of the present invention, thus allowing the defective component to be easily found and then repaired without having to remove all of the potting gel.

Platinum catalyst include chloroplatinic acid and its hexahydrate as described in U.S. Pat. No. 2,823,218, issued Feb. 11, 1958 to Speier et al., the reaction products of chloroplatinic acid with vinyl endblocked polysiloxane fluids such a sym-divinyltetramethyldisiloxane as described by Willing in U.S. Pat. No. 3,419,593, issued Dec. 31, 1968, the alkene complexes described by Ashby in U.S. Pat. No. 3,159,601, issued Dec. 1, 1964, and in U.S. Pat. No. 3,159,662, issued Dec. 1, 1964, the platinum acetylacetonate described by Baney in U.S. Pat. No. 3,723,497, issued Mar. 27, 1973, the platinum alcoholates described by Lamoreaux in U.S. Pat. No. 3,220,972, issued Nov. 30, 1965, and in many more patents which describe other types of platinum catalysts and other types of hydrosilation catalysts. The foregoing patents describing platinum catalyst are hereby incorporated by reference to show the various type of platinum catalyst. The preferred catalyst are those described by Willing.

In using the hydrosilation catalyst in which the metal is platinum, the composition may begin to cure immediately when the SiH polymethylsiloxane, the vinyl containing polyorganosiloxane, and the platinum catalyst are mixed. Those compositions which are not intended to be cured immediately, should contain a platinum catalyst inhibitor which retards the addition reaction at room temperature and in some situations up to 50° or 70° C. In those instances in which all the ingredients are packaged in one container, stored, shipped, and then cured at a later date, a platinum catalyst inhibitor should be used. In those instances in which the ingredients are mixed shortly before the cure is desired and where an extended pot life is desired to provide for the preparation of enough material for a working day, the compositions should contain a platinum catalyst inhibitor.

There are many platinum catalyst inhibitors known. Each of these inhibitors have special characteristics which may make them suitable for certain applications. However, this invention does not deal with special characteristics of the platinum catalyst inhibitors, but is directed to the novel polymethylsiloxane containing silicon-bonded hydrogen atoms and the compositions which can be made using this polymethylsiloxane. Some of the platinum catalyst inhibitors which are well known in the art include, benzotriazole as described in U.S. Pat. No. 3,192,181, issued June 29, 1965; the acetylenic compounds described in U.S. Pat. No. 3,445,420, issued May 20, 1969; the aromatic heterocyclic nitrogen compounds, pyridazine, pyrazine, quinoline, 2,2'-biquinoline, bipyridine, naphthyridine, quinaldine, dialkyl formamides, thioamides, alkylthioureas, and ethylene thiourea described in U.S. Pat. No. 3,188,299, issued June 8, 1965; the organophosphorus compounds as described in U.S. Pat. No. 3,188,300, issued June 8, 1965; the nitrile compounds as described in U.S. Pat. No. 3,344,111, issued Sept. 26, 1967; the halocarbons described in U.S. Pat. No. 3,383,356, issued May 14, 1968; the vinyl silazanes described in U.S. Pat. No. 3,453,233, issued July 1, 1969; the sulfoxide compounds described in U.S. Pat. No. 3,453,234, issued July 1, 1969; the stannous salts, the mercuric salts, the bismuth(+3) salts, the cuprous salts, and the cupric salts described in U.S. Pat. No. 3,532,649, issued Oct. 6, 1970; the polymethylvinylsiloxane cyclics discussed in U.S. Pat. No. 3,923,705; issued Dec. 2, 1975; and many others. The preferred platinum catalyst inhibitors for the compositions of this invention are the polymethylvinylsiloxane cyclics, the acetylenic compounds, and the mixture thereof. The above patents related to platinum catalyst inhibitors are hereby incorporated by reference to show the various platinum catalyst inhibitors and their use in addition cure compositions which contain silicon-bonded hydrogen atoms and silicon-bonded vinyl radicals.

The compositions which use the polymethylsiloxane containing the silicon-bonded hydrogen atoms can also contain other ingredients such as fillers, siloxane resins, heat stability additives, pigments, and other well known ingredients used in silicone compositions. Such additional ingredients may cause the compositions to cure to products which are not transparent, however, there are many application in which the products to not need to be transparent.

The compositions can contain amounts of polymethylsiloxane containing silicon-bonded hydrogen and vinyl containing polyorganosiloxane such that the composition will crosslink when a hydrosilation catalyst is added, either at room temperature or at an elevated temperature. The crosslinking can be such that the cured product is a soft gel, an elastomeric material, or a resinous material. The particular advantages of this invention are found in the gel products which can also exhibit the low temperature properties of the polymethylsiloxane containing the silicon-bonded hydrogen atoms. The hydrosilation catalyst can be present in an amount sufficient to cause the addition reaction between the silicon-bonded hydrogen and the silicon-bonded vinyl radicals to take place. This amount may be very small, such as 0.1 to 40 parts by weight per one million parts by weight of the composition based on the weight of metal present. The amount of the platinum catalyst inhibitor, when used, will vary with the kind of retardation desired and the kind of inhibitor used. The various patents cited above will help direct those wishing to use a platinum catalyst inhibitor to select the correct type and amount of inhibitor.

The compositions which are of particular interest with respect to products which exhibit the low temperature properties are the gels. The gels are preferably made by crosslinking the polymethylsiloxane containing the silicon-bonded hydrogen with a vinyldimethylsiloxy endblocked polydimethylsiloxane or a vinyl containing polyorganosiloxane as described by Brown et al. in U.S. Pat. No. 4,374,967 which is hereby incorporated by reference to show these vinyl containing polyorganosiloxanes and to show their preparation.

The preferred gel compositions are made from the polymethylsiloxane containing silicon-bonded hydrogen and vinyldimethylsiloxy endblocked polydimethylsiloxane having a ratio of moles of SiH to moles of silicon-bonded vinyl of from 0.25/1.0 to 5.0/1.0. The preferred vinyldimethylsiloxy endblocked polydimethylsiloxanes are those which contain an average of from 3 to 20 dimethylsiloxane units per molecule and compositions made therefrom which have a ratio of moles of SiH to silicon-bonded vinyl of from 0.5/1.0 to 2/1.0 and are cured with a platinum catalyst. The preferred vinyl containing polyorganosiloxane of Brown et al. are those described above and the compositions made therefrom have a ratio of moles of SiH to moles of silicon-bonded vinyl of from 0.25/1.0 to 1.0/1.0. These preferred compositions cure to gel products which can exhibit low temperature properties. The gel products which are preferred are those which have a penetration of from 1 mm to 7 mm.

The following examples are for illustrative purposes and should not be construed as limiting the present invention which is properly delineated in the claims. The "parts" are parts by weight unless otherwise stated. The viscosities were measured at 25° C. unless otherwise specified.

EXAMPLE 1

A polymethylsiloxane containing silicon-bonded hydrogen was prepared by mixing the following ingredients, heating the mixture to between 60° and 70° C. for 4.5 hours, thereafter neutralizing with 50 g of sodium bicarbonate, filtering to remove the acid salt and sodium bicarbonate, and then stripping the product at 130° C. at 27 Pa to obtain the polymethylsiloxane. The ingredients were:
- 43.08 g: trimethylsiloxy endblocked polydimethylsiloxane having a viscosity of 0.00001 square metres per second(hereinafter referred to as Ingredient A),
- 393.1 g: polydimethylsiloxane cyclic tetramer(-hereinafter referred to as Ingredient B),
- 76.06 g: hydrolyzate containing 21.3 weight percent methylsilsesquioxane units, 74.1 weight percent dimethylsiloxane units, and 4.6 weight percent trimethylsiloxy units(hereinafter referred to as Ingredient C),
- 8.5 g: sym-dihydrogentetramethyldisiloxane(-hereinafter referred to as Ingredient D), and
- 2.19 g: trifluoromethane sulfonic acid.

The resulting polymethylsiloxane containing SiH (hereinafter referred to as Polymer A) had the following units:
- 92.53 mole % dimethylsiloxane units,
- 4.01 mole % methylsilsesquioxane units,
- 1.66 mole % trimethylsiloxy units, and
- 1.79 mole % monohydrogendimethylsiloxy units.

Polymer A had a viscosity of 0.000435 square metres per second, a glass transition temperature, Tg, of $-123°$ C., and no melting points, $T_m$, and the SiH as H was 0.013 weight percent.

EXAMPLE 2

A polymethylsiloxane containing silicon-bonded hydrogen was prepared by mixing the following ingredients, heating the mixture at 60° C. for four hours, thereafter neutralizing with 25 g of sodium bicarbonate, filtering to remove the acid salt and sodium bicarbonate, and then stripping the product at 120° C. at 27 Pa to obtain the polymethylsiloxane. The ingredients were:
- 19.89 g: trimethylsiloxy endblocked polydimethylsiloxane having a viscosity of 0.0000015 square meters per second (hereinafter referred to as Ingredient E),
- 419.3 g: Ingredient B,
- 75.9 g: Ingredient C,
- 3.88 g: Ingredient D, and
- 0.77 g: trifluoromethane sulfonic acid.

The resulting polymethylsiloxane containing SiH (hereinafter referred to as Polymer B) had the following units:
- 92.87 mole % dimethylsiloxane units,
- 4.02 mole % methylsilsesquioxane units,
- 2.28 mole % trimethylsiloxy units, and
- 0.82 mole % monohydrogendimethylsiloxy units.

Polymer B had a viscosity of 0.00069 m$^2$/s, Tg of $-120°$ C., no $T_m$ points, and the SiH as H was 0.012 weight percent.

EXAMPLE 3

A polymethylsiloxane containing silicon-bonded hydrogen was prepared by mixing the following ingredients, heating the mixture to 62° C. for eight hours, thereafter neutralizing with 30 g of sodium bicarbonate, filtering to remove the acid salt and sodium bicarbonate, and then stripping the product at 120° C. at 27 Pa to obtain the polymethylsiloxane. The ingredients were:
- 19.89 g: Ingredient E,
- 419.3 g: Ingredient B,
- 75.90 g: Ingredient C,
- 3.88 g: Ingredient D, and
- 0.77 g: trifluoromethane sulfonic acid.

The resulting polymethylsiloxane containing SiH (hereinafter referred to as Polymer C) had the following units:
- 92.53 mole % dimethylsiloxane units,
- 4.01 mole % methylsilsesquioxane units,
- 1.66 mole % trimethylsiloxy units, and
- 1.79 mole % monohydrogendimethylsiloxy units.

Polymer C had a viscosity of 0.000764 m$^2$/s, a $T_g$ of $-120°$ C., a small amount of crystallinity in the polymer exhibited a $T_m$ at $-57°$ C., the SiH as H was 0.012 weight percent, and the OH was 0.03 weight percent.

EXAMPLE 4

A polymethylsiloxane containing silicon-bonded hydrogen was prepared by mixing the following ingredients, heating the mixture to 62° C. for four hours, thereafter neutralizing with 30 g of sodium bicarbonate, filtering to remove the acid salt and sodium bicarbonate, and then stripping the product at 120° C. at 27 Pa to obtain the polymethylsiloxane. The ingredients were:
- 24.86 g: Ingredient E,
- 394.4 g: Ingredient B,
- 94.9 g: Ingredient C,
- 4.85 g: Ingredient D, and
- 0.77 g: trifluoromethane sulfonic acid.

The resulting polymethylsiloxane containing SiH (hereinafter referred to as Polymer D) had the following units:
- 91.10 mole % dimethylsiloxane units,
- 5.03 mole % methylsilsesquioxane units,
- 2.84 mole % trimethylsiloxy units, and
- 1.02 mole % monohydrogendimethylsiloxy units.

Polymer D had a viscosity of 0.000696 m$^2$/s, a $T_g$ of $-120°$ C., no $T_m$ points, the SiH as H was 0.012 weight percent, and the OH was 0.01 weight percent.

EXAMPLE 5

A polymethylsiloxane containing silicon-bonded hydrogen was prepared by mixing the following ingredients, heating the mixture to 62° C. for four hours, thereafter neutralizing with 30 g of sodium bicarbonate, filtering to remove the acid salt and sodium bicarbonate, and then stripping the product at 120° C. at 27 Pa to obtain the polymethylsiloxane. The ingredients were the same as those described in Example 3 and the resulting polymethylsiloxane containing SiH had the same mole percentages of units as described in Example 3. The polymethylsiloxane of this example is hereinafter referred to as Polymer E, which had a viscosity of 0.000762 m²/s, a $T_g$ of $-120°$ C., no $T_m$ points, the SiH as H was 0.014 weight percent, and the OH was 0.02 weight percent.

EXAMPLE 6

Polymer A was used to make compositions which cured to products at room temperature and by heating. The compositions were made by thoroughly mixing the ingredients. The vinyl polyorganosiloxane was a vinyldimethylsiloxy endblocked polydimethylsiloxane having an average of 5.7 dimethylsiloxane units per molecule. The platinum catalyst, in the amount of 0.03 g, was the reaction product of chloroplatinic acid hexahydrate and sym-divinyltetramethyldisiloxane as described by Willing in U.S. Pat. No. 3,419,593 in which this complex had 0.85 weight percent platinum. Each of the compositions contained 0.012 g of tetravinyltetramethylcyclotetrasiloxane to slow the cure rate slightly but the vinyl content of this compound was not calculated as part of the mole ratio of the SiH to silicon-bonded vinyl. The amounts of the ingredients in grams is shown in Table I which also shows the mole ratio of SiH to silicon-bonded vinyl, the cure time at room temperature was 5–24 hours, and the penetration in mm after being cured for 15 minutes at 150° C.

The penetration was measured in 0.1 mm units using a Precision Penetrometer with a 4.5 g probe attached to a 15 g plunger. The penetration of the probe into a 50 g gel sample, cured for 15 minutes at 150° C., was measured. Penetration readings were taken after five seconds. A penetration readings of 1 mm and above are considered gels and those materials which have a reading below 1 mm are considered elastomeric materials or very hard gels.

TABLE I

| COMPO-SITION | GRAMS POLYMER A | GRAMS VINYL POLYMER | RATIO SiH/SiVinyl | mm, PENE-TRATION |
|---|---|---|---|---|
| 1 | 10 | — | — | — |
| 2 | 20 | 0.36 | 4.0/1.0 | 6.0 |
| 3 | 20 | 0.36 | 4.0/1.0 | 5.3 |
| 4 | 20 | 0.73 | 2.0/1.0 | 0.3 |
| 5 | 20 | 1.47 | 1.0/1.0 | 0.1 |

Composition 1 containing 0.015 g of the tetravinyltetramethylcyclotetrasiloxane did not cure even after heating for 15 min. at 150° C., because this composition did not contain any vinyl polyorganosiloxane to cause the material to crosslink.

Composition 2 showed no $T_m$ points, had a $T_g$ of $-120°$ C., and was a soft gel but had many large bubbles in it.

Composition 3 was a repeat of Composition 2 except the sample was deaired before it was cured to avoid the bubble formation, however some bubbles still developed during curing.

Composition 4 showed some separation upon cooling after the curing step.

Composition 5 cured to a very firm gel.

EXAMPLE 7

Polymer B was used to make compositions which cured to products at room temperature and by heating. The compositions were prepared in the same manner as in Example 6. The ingredients and their amounts were the same as in Example 6 except as shown in Table II. These compositions cured at room temperature in 5 to 20 hours.

TABLE II

| COMPO-SITION | GRAMS POLYMER B | GRAMS VINYL POLYMER | RATIO SiH/SiVinyl | mm, PENE-TRATION |
|---|---|---|---|---|
| 6 | 20 | 0.32 | 2.0/1.0 | 3.0 |
| 7 | 20 | 0.52 | 1.25/1.0 | 1.0 |
| 8 | 20 | 0.65 | 1.0/1.0 | 1.5 |
| 9 | 20 | 0.84 | 0.77/1.0 | 4.0 |
| 10 | 100 | 4.2 | 0.77/1.0 | 5.8 |

Composition 6 cured with a few large gas bubbles which were formed during curing.

Composition 7 cured to a gel.

Composition 8 cured to a good clear gel.

Composition 9 cured to a very good, clear gel with a desirable penetration for a potting material useful to encapsulate electrical equipment.

Composition 10 cured to a gel with a cure time of 7.1 minutes which was determined by using a Tecam Gelation Timer with a ⅞ inch spindle inserted in a 100 g sample immersed in a 135° C. oil bath. Increasing resistance on the spindle was generated by the formation of the gel curing reaction, and the period of time necessary to trip the timer on the spindle was recorded.

EXAMPLE 8

Polymer A was used to make compositions which cured to products at room temperature and by heating. The compositions were prepared as described in Example 6 using the ingredients and the amounts as shown except as stated. The platinum catalyst was added in an amount of two drops and the tetramethyltetravinylcyclotetrasiloxane was added in an amount of one drop. The amounts of the ingredients and penetration are shown in Table III as well as the mole ratio of SiH to silicon-bonded vinyl. The vinyl containing polyorganosiloxane used was a polymer as prepared by the method of U.S. Pat. No. 4,374,967, had a viscosity of 0.000489 m²/s, and the mole percentages of the units was as follows:

93.3 mole % dimethylsiloxane units,
4.1 mole % methylsilsesquioxane units,
2.0 mole % trimethylsiloxy units, and
0.6 mole % vinyldimethylsiloxy units.

The vinyl containing polyorganosiloxane had a vinyl content of 0.26 weight percent.

TABLE III

| COMPO-SITION | GRAMS POLYMER A | GRAMS VINYL POLYMER | RATIO SiH/SiVinyl | mm, PENE-TRATION |
|---|---|---|---|---|
| 11 | 2.5 | 17.5 | 0.2/1.0 | NO GEL |
| 12 | 3.75 | 16.25 | 0.31/1.0 | 5.9 |
| 13 | 3.75 | 16.25 | 0.31/1.0 | 6.1 |
| 14 | 5 | 15 | 0.45/1.0 | 1.5 |
| 15 | 10 | 10 | 1.35/1.0 | <0.2 |

Composition 11 did not cure to a gel but some crosslinking was notice because a stringy-type fluid was form.

Composition 12, 13, and 14 cured to good gels.

Composition 15 cured to a very hard gel which exhibited bubble formation and gel splitting.

EXAMPLE 9

Compositions were prepared as described in Example 6 using the ingredients as follows: the polymethylsiloxane containing SiH(20 g) was as identified in Table IV, the vinyl containing polyorganosiloxane is as described in Example 6 except that there was an average of six dimethylsiloxane units per molecule(0.84 g), the platinum catalyst as defined in Example 6(0.03 g), and tetramethyltetravinylcyclotetrasiloxane(0.01 g). The mole ratio of SiH to silicon-bonded vinyl was 0.88/1.0. The penetration was determined as described in Example 6 and the results are shown in Table IV.

TABLE IV

| COMPOSITION | POLYMER | mm, PENETRATION |
|---|---|---|
| 16 | C | 4.5 |
| 17 | D | 1.1 |
| 18 | E | 3.2 |

Composition 16 cured to a very clear gel with a very small amount of crystallinity was observed which had a $T_m$ at $-58°$ C.

Composition 17 cured to a very clear gel with no $T_m$ points.

Composition 18 cured to a very clear gel with a very small amount of crystallinity was observed which had a $T_m$ at $-57.4°$ C.

That which is claimed is:

1. A polymethylsiloxane containing silicon-bonded hydrogen consisting of 84 to 96 mole percent dimethylsiloxane units, 2 to 10 mole percent methylsilsesquioxane units, 0.5 to 6 mole percent trimethylsiloxy units, and 0.25 to 3 mole percent monohydrogendimethylsiloxy units, where the total mole percent of trimethylsiloxy units and monohydrogendimethylsiloxy units is at least 1.5.

2. The polymethylsiloxane containing silicon-bonded hydrogen according to claim 1 in which the mole percentages of the units are 90 to 94 for the dimethylsiloxane units, 4.5 to 7 for the methylsilsesquioxane units, 2 to 3 for the trimethylsiloxy units, and 0.5 to 2 for the monohydrogendimethylsiloxy units, and where the total mole percent of the trimethylsiloxy units and the monohydrogendimethylsiloxy units is from 2.5 to 5.

3. A composition comprising the polymethylsiloxane of claim 1 and a crosslinking agent.

4. The composition according to claim 3 in which the crosslinking agent is a vinyl containing polyorganosiloxane and a hydrosilation catalyst.

5. The composition according to claim 4 in which the vinyl containing polyorganosiloxane is a vinyldimethylsiloxy endblocked polydimethylsiloxane.

6. The composition according to claim 5 in which the hydrosilation catalyst is a platinum catalyst.

7. The composition according to claim 4 in which the hydrosilation catalyst is a platinum catalyst.

8. The composition according to claim 6 further comprising a platinum catalyst inhibitor.

9. The composition according to claim 7 further comprising a platinum catalyst inhibitor.

10. The composition according to claim 4 in which the vinyl containing polyorganosiloxane consists essentially of 80 to 96.5 mole percent dimethylsiloxane units, 2 to 10 mole percent methylsilsesquioxane units, and 1.25 to 6 mole percent trimethylsiloxy units, and 0.25 to 4 mole percent monovinyldimethylsiloxy units.

11. The composition according to claim 6 in which the polymethylsiloxane containing silicon-bonded hydrogen and the vinyldimethylsiloxy endblocked polydimethylsiloxane are present in amounts to provide a ratio of moles of SiH to moles of silicon-bonded vinyl of from 0.25/1.0 to 5/1.0.

12. The composition according to claim 11 in which the vinyldimethylsiloxy endblocked polydimethylsiloxane has an average of from 3 to 20 dimethylsiloxane units per molecule and the ratio of the moles of SiH to silicon-bonded vinyl is from 0.5/1.0 to 2/1.0.

13. A gel obtained by curing the composition of claim 12 where the gel has a penetration of from 1 mm to 7 mm.

14. The composition according to claim 10 in which the ratio of the moles of SiH to silicon-bonded vinyl is from 0.25/1.0 to 1.0/1.0.

15. A gel obtained by curing the composition of claim 14 where the gel has a penetration of from 1 mm to 7 mm.

* * * * *

UNITED STATES PATENT AND TRADEMARK OFFICE
CERTIFICATE OF CORRECTION

PATENT NO. : 4,613,659

DATED : Sept. 23, 1986

INVENTOR(S) : Chi-long Lee and Myron T. Maxson

It is certified that error appears in the above-identified patent and that said Letters Patent is hereby corrected as shown below:

Col. 1, Line 26: "silicones gels" should read "silicone gels"

Col. 1, Line 49: $R_2'SiO_2$ should read $R_2'SiO$ $R_2'SiO_{1.5}$ should read $R'SiO_{1.5}$ $R_2'SiO_{0.5}$ should read $R_3'SiO_{0.5}$ Col. 4, Line 25: "many application" should read "many applications"

Col. 4, Line 25: "products to not" should read "products do not"

Col. 8, Line 64: "was notice" should read "was noticed"

Col. 8, Line 65: "was form" should read "was formed"

Signed and Sealed this

Eighteenth Day of August, 1987

Attest:

DONALD J. QUIGG

Attesting Officer

Commissioner of Patents and Trademarks